United States Patent
Parmar

(10) Patent No.: US 11,526,832 B2
(45) Date of Patent: Dec. 13, 2022

(54) COMPUTING PLATFORM FOR MOVEMENT OF ONE OR MORE CONTAINERS AND METHOD THEREOF

(71) Applicant: RIMTEX INDUSTRIES, Gujarat (IN)

(72) Inventor: Kalpesh G. Parmar, Gujarat (IN)

(73) Assignee: RIMTEX INDUSTRIES, Gujarat (IN)

( * ) Notice: Subject to any disclaimer, the term of this patent is extended or adjusted under 35 U.S.C. 154(b) by 105 days.

(21) Appl. No.: 17/269,300

(22) PCT Filed: Aug. 17, 2019

(86) PCT No.: PCT/IN2019/050604
§ 371 (c)(1),
(2) Date: Feb. 18, 2021

(87) PCT Pub. No.: WO2020/039457
PCT Pub. Date: Feb. 27, 2020

(65) Prior Publication Data
US 2021/0216957 A1    Jul. 15, 2021

(30) Foreign Application Priority Data

Aug. 18, 2018   (IN) .............................. 201821030987
Jun. 15, 2019   (IN) .............................. 201921023827

(51) Int. Cl.
*G06Q 10/08*   (2012.01)
*G06K 7/10*    (2006.01)

(52) U.S. Cl.
CPC ..... *G06Q 10/0832* (2013.01); *G06K 7/10099* (2013.01); *G06K 7/10386* (2013.01); *G06Q 10/087* (2013.01); *G06Q 10/0833* (2013.01)

(58) Field of Classification Search
CPC ........... G06Q 10/0832; G06Q 10/0833; G06Q 10/087; G06K 7/10099; G06K 7/10386
(Continued)

(56) References Cited

U.S. PATENT DOCUMENTS

| 2016/0171433 A1* | 6/2016 | Dearing ................. G06Q 50/32 235/385 |
| 2017/0053239 A1* | 2/2017 | Schoening ........... H01Q 1/2216 |
| 2018/0196409 A1* | 7/2018 | Ben-Bassat ............. G06F 16/23 |

OTHER PUBLICATIONS

"On the use of RFID in the management of reusable containers in closed-loop supply chains under stochastic container return quantities" (Year: 2014).*

(Continued)

*Primary Examiner* — Zeina Elchanti
(74) *Attorney, Agent, or Firm* — Meunier Carlin & Curfman LLC

(57) ABSTRACT

The present invention discloses a computing platform (100) for movement of one or more containers (102) and method thereof. The present invention provides an improved platform and method for use in an industrial automation environment. Each container (102) includes a chip (104) having container related data. A scanner (108) scans the chip (104), and detect placement related data, and information pertaining to quality parameters of associated material filled in the container (102). A measurement module (110) measures the quality of material. The processing unit (112) assigns the characteristics of the carding machine (106) to the chip (104), and process the container (102) from the assigned carding machine (106) to a second carding machine. The indicator (114) generates an indicating signal. The output generation module (116) generates an output based on the signal, the measured quality, and the characteristics. The report generation module (118) generates a report.

32 Claims, 11 Drawing Sheets

(58) Field of Classification Search
USPC .......................................................... 705/332
See application file for complete search history.

(56) References Cited

OTHER PUBLICATIONS

International Search Report and Written Opinion dated Dec. 17, 2019, from International Application No. PCT/IN2019/050604, 8 pages.

* cited by examiner

300

| | |
|---|---|
| Material Process | 100 % Cotton |
| Length of Material | 0.500   meter |
| Hank / Ne | 0.9 |
| Sliver weight | 4   kg |
| Material Mixing Detail | sanbar 6 |
| Select Next Station | ☑ BDF 1 |
| | ☑ BDF 2 |

FIGURE 3

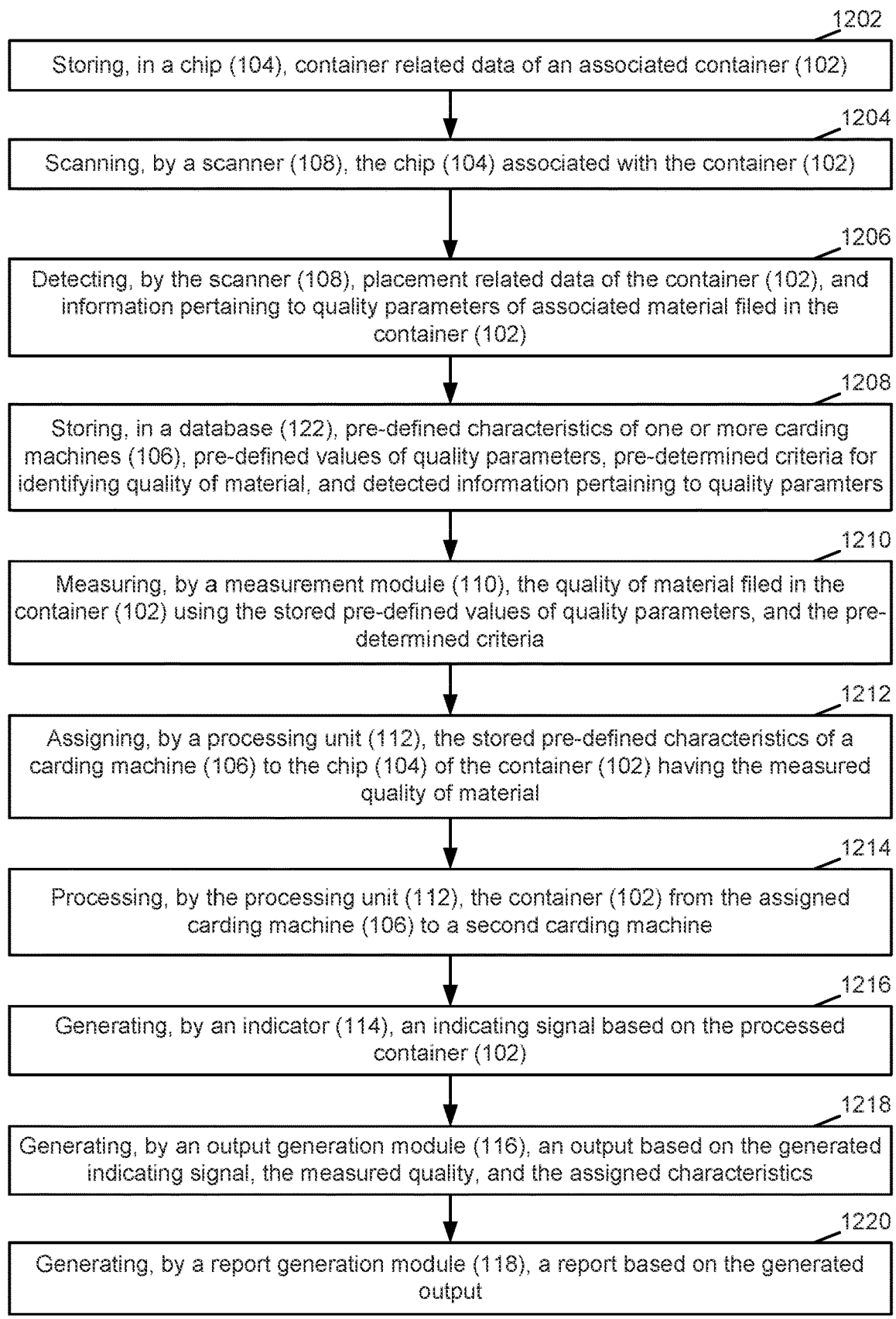
FIGURE 12      1200

COMPUTING PLATFORM FOR MOVEMENT OF ONE OR MORE CONTAINERS AND METHOD THEREOF

TECHNICAL FIELD

The present invention relates generally to a computing platform for movement of one or more containers.

BACKGROUND

There has been a recent increased emphasis on the use of systems for performing various activities in an industry. This lead to sudden development of automation of various processes and methods which were traditionally done manually. One of the exemplary industries is a textile industry which is constantly in flux of industrial automation. Conventionally, textile mills utilize a large amount of raw material for conversion of the raw material to one or more finished products. These textile mills use a large number and different types of machines for said conversion process. During the conversion of the raw material to an intermediary or the final product, this raw material is moved from one workstation to next workstation, one department to the other, one machine to another machine, and from one floor to other in a plurality of storage devices, such as containers/cans. During such tasks, there are higher chances of mismanagement such as mixing can carrying one type of raw material with another type of raw material, stoppage of the machine due to lack of material or labour. Hence, these tasks are time consuming and create a possibility of human errors. Also, with the automation environment, gradually the production of every machine is increasing and for achieving the target of such high production, particularly, the spinning industries are facing challenges of safe, efficient and economical material handling through such cans.

It has been estimated that average material handling cost is approximately 10-30% of the total production cost depending upon the product. Thus, by saving in the material handling cost, the cost of the production can be reduced significantly. Further, the material handling involves movement of the raw materials either manually or mechanically in consignments or one product at a time within the plant. This movement of raw materials can be horizontal, it can be vertical or can be the combination of these two. Apart from the manual transportation of the raw material or spinning cans from one machine to the other or from one floor to the other, there are conventional methods that use transportation systems of a conveyor system with installation of conveyors on the floor or an aerial transportation system with rails at the top. These conventional techniques require installation of a conveyor or rail, which is very difficult and more space consuming. However, the problem of mismanagement of raw materials, shortage of raw materials, and other human errors cannot be eliminated by such conventional techniques.

Further, during such tasks, labors have to perform a manual checking method for measuring quality parameters of the raw material. As per the time schedule, the labors check raw material quality parameters, but sometimes till they get results, some storage devices having the raw material may passed from one machine to another machine for next process. In case of quality problem found in the raw material result, many poor quality raw materials might have moved for next processes, then it cannot be determined how much bad quality of raw material processed, and in which stages of processes, bad quality material has been passed through.

Typically, different raw materials are being processed, for example cotton combed, cotton carded, polyester, poly cotton, sliver, and the like, and it is manual planning of distribution of different raw materials for different processes/tasks. Therefore, there are high chances of errors in distribution of different material for different processes/tasks, manually.

Hence, there is a need of an invention which solves the above defined problems and provides a computing platform for movement of one or more containers, which intelligently tackle the above defined technical problems.

SUMMARY

This summary is provided to introduce concepts related to a computing platform for movement of one or more containers and method thereof. This summary is neither intended to identify essential features of the present invention nor is it intended for use in determining or limiting the scope of the present invention.

For example, various embodiments herein may include one or more computer platforms for movement of one or more containers and methods are provided. In one of the embodiments, the method for movement of one or more containers in a computing platform includes storing, in a chip, container related data of an associated container. The method includes a step of scanning, by a scanner, the chip associated with the container. The method includes a step of detecting, by the scanner, placement related data of the container, and information pertaining to quality parameters of associated material filled in the container. The method includes a step of storing, in a database, pre-defined characteristics of one or more carding machines, pre-defined values of quality parameters, pre-determined criteria for identifying quality of material, and detected information pertaining to quality parameters. The method includes a step of measuring, by a measurement module, the quality of material filled in the container using the stored pre-defined values of quality parameters, and the pre-determined criteria. The method includes a step of assigning, by a processing unit, the stored pre-defined characteristics of a carding machine to the chip of the container having the measured quality of material. The method includes a step of processing, by the processing unit, the container from the assigned carding machine to a second carding machine. The method includes a step of generating, by an indicator, an indicating signal based on the processed container. The method includes a step of generating, by an output generation module, an output based on the generated indicating signal, the measured quality, and the assigned characteristics. The method includes a step of generating, by a report generation module, a report based on the generated output.

In another embodiment, a computing platform for movement of one or more containers includes a plurality of containers, one or more carding machines, an output generation module, and a report generation module. Each container of the plurality of containers includes a chip having container related data. The carding machines are configured to cooperate with the plurality of containers. Each carding machine includes a scanner, a database, a measurement module, a processing unit, and an indicator. The scanner is configured to scan the chip associated with the container, and detect placement related data of the container, and information pertaining to quality parameters of associated material filled in the container. The database is configured to store pre-defined characteristics of the one or more carding machines, pre-defined values of quality parameters, pre-determined criteria for identifying quality of material, and detected information pertaining to quality parameters. The measurement module is configured to measure the quality of material filled in the container using the stored pre-defined values of quality parameters, and the pre-determined criteria. The processing unit is configured to assign the stored pre-defined characteristics of said carding machine to the chip of the container having the measured quality of material, and process the container from the assigned carding machine to a second carding machine. The indicator is configured to generate an indicating signal based on the processed container. The output generation module is configured to generate an output based on the generated indicating signal, the measured quality, and the assigned characteristics. The report generation module is configured to generate a report based on the generated output.

BRIEF DESCRIPTION OF ACCOMPANYING DRAWINGS

The detailed description is described with reference to the accompanying figures. In the figures, the left-most digit(s) of a reference number identifies the figure in which the reference number first appears. The same numbers are used throughout the drawings to reference like features and modules.

FIG. 3 illustrates data filled information captured by a carding machine of FIG. 2, according to an exemplary implementation of the present invention.

FIG. 12 illustrates a flowchart depicting a method for movement of one or more containers in a computing platform, according to an exemplary implementation of the present invention.

Figure 1:
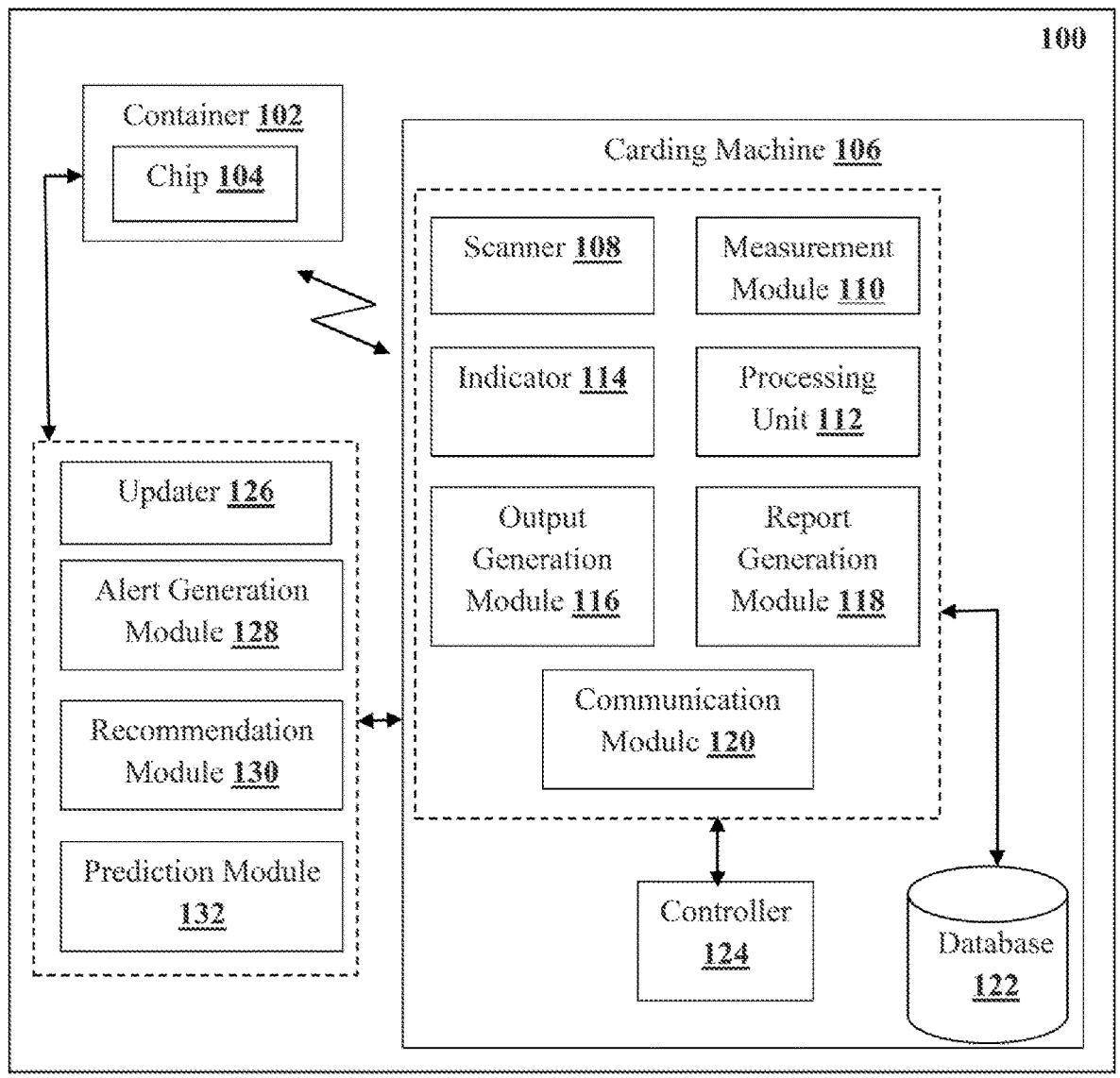
FIG. 1 illustrates a block diagram depicting a computing platform for movement of one or more containers, according to an exemplary implementation of the present invention.

It should be appreciated by those skilled in the art that any block diagrams herein represent conceptual views of illustrative systems embodying the principles of the present invention. Similarly, it will be appreciated that any flowcharts, flow diagrams, and the like represent various processes which may be substantially represented in computer readable medium and so executed by a computer or processor, whether or not such computer or processor is explicitly shown.

DETAILED DESCRIPTION

In the following description, for the purpose of explanation, specific details are set forth in order to provide an understanding of the present invention. It will be apparent, however, to one skilled in the art that the present invention may be practiced without these details. One skilled in the art will recognize that embodiments of the present invention, some of which are described below, may be incorporated into a number of systems.

The various embodiments of the present invention provide a computing platform for movement of one or more containers and method thereof.

Furthermore, connections between components and/or modules within the figures are not intended to be limited to direct connections. Rather, these components and modules may be modified, re-formatted or otherwise changed by intermediary components and modules.

References in the present invention to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

In one of the embodiments, the method for movement of one or more containers in a computing platform includes storing, in a chip, container related data of an associated container. The method includes a step of scanning, by a scanner, the chip associated with the container. The method includes a step of detecting, by the scanner, placement related data of the container, and information pertaining to quality parameters of associated material filled in the container. The method includes a step of storing, in a database, pre-defined characteristics of one or more carding machines, pre-defined values of quality parameters, pre-determined criteria for identifying quality of material, and detected information pertaining to quality parameters. The method includes a step of measuring, by a measurement module, the quality of material filled in the container using the stored pre-defined values of quality parameters, and the pre-determined criteria. The method includes a step of assigning, by a processing unit, the stored pre-defined characteristics of a carding machine to the chip of the container having the measured quality of material. The method includes a step of processing, by the processing unit, the container from the assigned carding machine to a second carding machine. The method includes a step of generating, by an indicator, an indicating signal based on the processed container. The method includes a step of generating, by an output generation module, an output based on the generated indicating signal, the measured quality, and the assigned characteristics. The method includes a step of generating, by a report generation module, a report based on the generated output.

In another implementation, the method includes a step of identifying container's position, properties of material, material quality, weight of the material, length of the material, and other parameters of the material, and storing identified container related data in the chip.

In another implementation, the method includes a step of updating the container related data with the characteristics of the carding machine, if the container is processed to the second carding machine.

In another implementation, the method includes a step of scanning the chip of the container, and transmitting the scanned data, if the updated container is processed to the second carding machine.

In another implementation, the method includes a step of receiving and processing the scanned data and confirming that the container is at the second carding machine.

In another implementation, the method includes a step of accepting the container related data and storing all the data related to the container in the database.

In another implementation, the step of generating the output further includes a step of generating an output by providing a first indicating value when the container is placed at the correct position.

In another implementation, the step of generating the output further includes generating an output by providing a second indicating value when the container is placed at the wrong position, and an indication to place the container at correct position.

In another implementation, the method includes a step of checking, by the measurement module, whether the container is fit enough to go to next carding machine based on the measured quality.

In another implementation, the method includes a step of generating, by an alert generation module, an alert for stopping processing of the container from the carding machine to the second carding machine, if the container contains bad quality material. Further, the method includes recommending, by a recommendation module, maintaining desired quality of material filled in the container, to the user.

In another implementation, the step of generating the report is based on the generated output and the generated alert.

In another implementation, the method includes predicting, by a prediction module, the quality of material filled in the container associated with the carding machine.

In another implementation, the report includes an ageing report, a material wastage report, a material breakages report, a material flow report, a fault prediction report, an alarm/alert/event report, a container traceability report, a machine traceability report, and a fault detection report.

In another implementation, the method includes a step of carrying, by an automated guided vehicle unit, the container, and transporting the container to a respective carding machine.

In another implementation, the method includes a step of accessing, by a handheld device, the computing platform, and performing functionalities on the computing platform.

In another embodiment, a computing platform for movement of one or more containers includes a plurality of containers, one or more carding machines, an output generation module, and a report generation module. Each container of the plurality of containers includes a chip having container related data. The carding machines are configured to cooperate with the plurality of containers. Each carding machine includes a scanner, a database, a measurement module, a processing unit, and an indicator. The scanner is configured to scan the chip associated with the container, and detect placement related data of the container, and information pertaining to quality parameters of associated material filled in the container. The database is configured to store pre-defined characteristics of the one or more carding machines, pre-defined values of quality parameters, pre-determined criteria for identifying quality of material, and detected information pertaining to quality parameters. The measurement module is configured to measure the quality of material filled in the container using the stored pre-defined values of quality parameters, and the pre-determined criteria. The processing unit is configured to assign the stored pre-defined characteristics of said carding machine to the chip of the container having the measured quality of material, and process the container from the assigned carding machine to a second carding machine. The indicator is configured to generate an indicating signal based on the processed container. The output generation module is configured to generate an output based on the generated indicating signal, the measured quality, and the assigned characteristics. The report generation module is configured to generate a report based on the generated output.

In another implementation, the one or more carding machines includes a communication module configured to receive the container related data from the plurality of containers.

In another implementation, the communication module is configured to transmit the generated indicating signal to the output generation module.

In another implementation, the one or more carding machines includes a controller. The controller is configured to control functionalities of the scanner, the measurement module, the indicator, the processing unit, the output generation module, the report generation module, and the communication module.

In another implementation, the chip is configured to identify container's position, properties of material, material quality, weight of the material, length of the material, and other parameters of the material, and is further configured to store identified data.

In another implementation, the computing platform includes other machines including a breaker draw frame machine, a unilap machine, a comber machine, a finisher draw frame machine, and a roving machine.

In another implementation, the computing platform includes an updater. The updater is configured to update the container related data stored in the chip with the characteristics of the carding machine, if the container is processed to the second carding machine.

In another implementation, if the container related data is updated with the characteristics of the carding machine, then the container is processed to the second carding machine.

In another implementation, the scanner is configured to scan the chip associated with the container, and transmit the scanned data to the processing unit, as the updated container is processed to the second carding machine.

In another implementation, the processing unit is configured to receive the scanned data and process the scanned data and confirm that the container is at the second carding machine.

In another implementation, the processing unit is configured to accept the container related data and store all the data related to the container in the database.

In another implementation, the output generation module is configured to generate an output by providing a first indicating value when the container is placed at the correct position.

In another implementation, the output generation module is configured to generate an output by providing a second indicating value when the container is placed at the wrong position, and is further configured to generate an indication to place the container at correct position.

In another implementation, the measurement module is configured to check whether the container is fit enough to go to next carding machine based on the measured quality.

In another implementation, the computing platform includes an alert generation module and a recommendation module. The alert generation module is configured to generate an alert to stop process of the container from the carding machine to the second carding machine, if the container contains bad quality material. The recommendation module is configured to recommend maintenance of desired quality of material filled in the container, to the user.

In another implementation, the generation module is configured to generate the report based on the generated output and the generated alert.

In another implementation, the computing platform includes a prediction module. The prediction module is configured to predict the quality of material filled in the container associated with the carding machine.

In another implementation, the computing platform includes an automated guided vehicle unit. The automated guided vehicle unit is configured to carry the container, and transport the container to a respective carding machine.

In another implementation, the computing platform includes a handheld device. The handheld device is configured to access the computing platform, and perform functionalities on the computing platform.

FIG. 1 illustrates a block diagram depicting a computing platform for movement of one or more containers, according to an exemplary implementation of the present invention.

The computing platform (100) includes a plurality of containers, one or more carding machines (104), an updater (126), an alert generation module (128), a recommendation module (130), and a prediction module (132).

Each of the containers (102) includes a chip (104), which is having container related data. In an embodiment, the chip (104) can be a microchip. In one embodiment, each microchip has a unique number that identifies the associated container (102). The chip is configured to identify container's position, properties of material filled in the container, material quality, weight of the material, length of the material, and other parameters of the material. The chip (104) is further configured to store the identified data related to the identified container (102).

The one or more carding machines (106) is configured to cooperate with the container (102) to receive the container related data. In an embodiment, the computing platform (106) can include a plurality of machines (102) includes carding machines, break draw frame machines, unilap machines, combers machine, roving machines, and the like. In an embodiment, the computing platform (100) is configured to interface with each machine of each type through a bus, and/or wired or wireless networks (not shown in a figure). Examples of the wired networks include, but are not limited to, a Wide Area Network (WAN) or a Local Area Network (LAN), a client-server network, a peer-to-peer network, and so forth. Examples of the wireless networks include, but are not limited to, Wi-Fi, a Global System for Mobile communications (GSM) network, and a general Packet Radio Service (GPRS) network, an enhanced data GSM environment (EDGE) network, 802.5 communication networks, Code Division Multiple Access (CDMA) networks, or Bluetooth networks.

Each of the carding machines (106) includes a scanner (108), a measurement module (110), a processing unit (112), an indicator (114), an output generation module (116), a report generation module (118), and a database (122).

The scanner (108) is configured to scan the chip (104) associated with the container (102) and detect placement related data of the container (102), and information pertaining to quality parameters of associated material filled in the container (102). In an embodiment, the scanning module (108) is configured to detect the information related to quality parameters of the material from a bus or other direct interface, the database (122), a report or other similar machine readable format, or by manual information entered by a user. In one embodiment, the scanner (108) is configured to detect information from cloud based sources including Open Database Connectivity (ODBC), Hypertext Transfer Protocol (HTTP), etc.

In an embodiment, the computing platform (100) includes an input module (not shown in a figure). The input module is configured to receive inputs from a user. The inputs may include information pertaining to quality parameters of the associated material filled in the container (102).

The database (122) is configured to store pre-defined characteristics of the one or more carding machines (106), pre-defined values of quality parameters, pre-determined criteria for identifying quality of material, and detected information pertaining to quality parameters. In an embodiment, the database (122) includes a look up table that stores pre-defined characteristics of one or more carding machines (106) by defining a plurality of parameters, pre-defined values of quality parameters, pre-determined criteria for identifying quality of material, and detected information pertaining to quality parameters. In an embodiment, the pre-defined values of quality parameters include unevenness (U %), co-efficient of variation of mass (CVM), imperfection index (IPI), hank properties values, and the like. In one embodiment, the pre-defined characteristics include formation of raw material, elimination of impurities of raw material, blending, orientation, parallelization, fiber orientation, web formation, and the like. In another embodiment, the pre-determined criteria include performance criteria, assessment criteria, setting standards/ protocols, ensuring quality standards, preventive measures, and the like.

The measurement module (110) is configured to cooperate with the scanner (108) to receive the detected data. The measurement module (110) is configured to measure the quality of material filled in the container (102) using the stored pre-defined values of quality materials, and the pre-determined criteria. The measurement module (110) is further configured to check whether the container (102) is fit enough to go to next machine based on the measured quality.

The processing unit (112) is configured to cooperate with the measurement module (110) to receive the measured quality of material. The processing unit (112) is configured to assign the pre-defined characteristics of the carding machine to the chip (104) of the container (102) having the measured quality of material, and process the container (102) from the assigned carding machine (106) to a second carding machine. In an embodiment, the scanner (108) is configured to scan the chip (104) associated with the container, and transmit the scanned data to the processing unit (112), as the updated container and is processed to the second carding machine. In another embodiment, the processing unit (112) is configured to receive the scanned data from the scanner (108) and process the scanned data and confirm that the container (102) is at the second carding machine. Further, the processing unit (112) is configured to accept the container related data and store all the data related to the container (102) in the database (122).

The indicator (114) is configured to cooperate with the processing unit (112) to receive the processed container (102). The indicator (114) is further configured to generate an indicating signal based on the processed container (102).

The output generation module (116) is configured to cooperate with the measurement module (110), the processing unit (112), and the indicator (114) to receive the measured quality, the processed container, and the indicating signal, respectively. The output generation module (116) is configured to generate an output based on the received signal, the measured quality, and the processed container. In an embodiment, the output generation module (116) is configured to generate an output by providing a first indicating value when the container (102) is placed at the correct position. In yet another embodiment, the output generation module (116) is configured to generate an output by providing a second indicating value when the container (102) is placed at the wrong position, and is further configured to generate an indication to place the container (102) at correct position.

The report generation module (118) is configured to cooperate with the output generation module (116) to receive the generated output. The report generation module (118) is configured to generate a report based on the generated output. In an embodiment, the report generation module (114) is configured to generate an ageing report, a raw material waste report, a raw material breakages report, a material flow report, a fault prediction report, an alarm/event report, a container traceability report, a machine traceability report, and a fault detection report.

In an embodiment, the ageing report represents filled/loaded cans/containers with their respective age in terms of hour available at any given point of time. When the container is filled, the report generation module (118) is configured to register an identity of the container along with a time-stamp of manufacturing of the container. Therefore, at any given point of time, the report generation module (118) may have record of the filled containers which are lying manufacturing with current date stamp and generate an ageing report for the registered identified container. In an embodiment, the report generation module (118) is configured to generate the ageing report based on the information related to loading and unloading containers along with the time-stamp. If a filled container lies idle/unused for more than 24 hours, the quality parameters get affected, the ageing report also keeps track of age of each container in terms of hours.

In another embodiment, the report generation module (118) is configured to generate the traceability report for machines and containers, where the computing platform (100) asks the user to select a particular container or machine, and then show a list of all the containers and machines from which the material has gone into making that container or machine. The list is shown in a form of a grid report, wherein a first field may show the container's/machine's identification number along with manufacturing time-stamp. A second field may be a list of the container's identification number along with the respective machine names and manufacturing timestamps. This may be followed in a third field by a list of containers for each of the containers in the second field, again with their respective identification numbers, manufacturing time-stamps and machine names, and the like until the first level of manufacturing machines is reached.

In an embodiment, the carding machine (106) includes a communication module (120). The communication module (120) is configured to receive the container related data from the container (102). In an embodiment, the communication module (120) is configured to transmit the generated indicating signal to the output generation module (116). In an embodiment, the communication module (120) is configured to transmit and receive the data to the container (102) and other modules. In an embodiment, the communication module (120) can be Wi-Fi, a Global System for Mobile communications (GSM) system, and a general Packet Radio Service (GPRS) system, an enhanced data GSM environment (EDGE) system, 802.5 communication system, a Code Division Multiple Access (CDMA) system, or a Bluetooth system.

In another embodiment, the carding machine (106) includes a controller (124). The controller (124) is configured to cooperate with the scanner (108), the measurement module (110), the processing unit (112), the indicator (114), the output generation module (116), the report generation module (118), and the communication module (120). The controller (124) is further configured to control functionalities of the scanner (108), the measurement module (110), the processing unit (112), the indicator (114), the output generation module (116), the report generation module (118), and the communication module (120). In an embodiment, the controller (124) is configured to generate machine processing commands. In an embodiment, the controller (124) may be implemented as one or more microcontrollers, central processing units, state machines, logic circuitries, and/or any devices that manipulate signals based on operational instructions.

In another embodiment, the computing platform (100) includes an updater (126), an alert generation module (128), a recommendation module (130), and a prediction module (132).

The updater (126) is configured to cooperate with the container (102) and the carding machine (106). The updater (126) is configured to update the container related data stored in the chip (104) with the characteristics of the carding machine (106), if the container (102) is moved to the other machine. If the updater (126) updates the container related data with the characteristics of the carding machine (106), the container (102) is moved to the other machine.

The alert generation module (128) is configured to cooperate with the container (102) and the carding machine (106). The alert generation module (128) is configured to generate an alert to stop process of the container (102) from the carding machine to the second carding machine, if the container (102) contains bad quality material. The recommendation module (130) is configured to cooperate with the container (102) and the carding machine (106). The recommendation module (130) is configured to recommend maintenance of the desired quality filled in the container, to the user.

In an embodiment, the report generation module (118) is configured to generate the report based on the generated output and the generated alert.

The prediction module (132) is configured to cooperate with the container (102) and the carding machine (106). The prediction module (132) is configured to predict the quality of material filled in the container (102) associated with the carding machine (106). In an embodiment, the prediction module (132) is configured to track the performance of each machine over a period of time. Based on the tracked data, the prediction module (132) is configured to predict output of each machine. In an embodiment, the predicted output may be used for predicting output quality of the material filled in the container which is associated with the carding machine (106). Thus, when a new form of a material is to be made by defining the quality parameters requirements, the prediction module (132) may able to predict a likely best line pattern configuration to follow to be able to give output meeting required quality parameter values.

In an embodiment, the measurement module (110) is configured to check whether the container (102) is fit enough to go to next machine based on the measured quality. If the container (102) is fit enough to go to next machine, the processing unit (112) is configured to process the container (102) into another machine. If the container is not fit, the alert generation module (128) is configured to generate the alert to the user and provide suggestions for maintaining desired quality of the material. In an embodiment, the suggestions are pre-defined based on conditions and the pre-determined criteria. In one embodiment, the alert may be in the form of an alarm, a signal, a beep, and the like. In an embodiment, the measurement module (110) is configured to indicate the quality issue of the material, if any, come in proses and the alert generation module (128) is configured to generate an alert signal to stop the process which defends the movement of bad quality material to next process.

Figure 11:
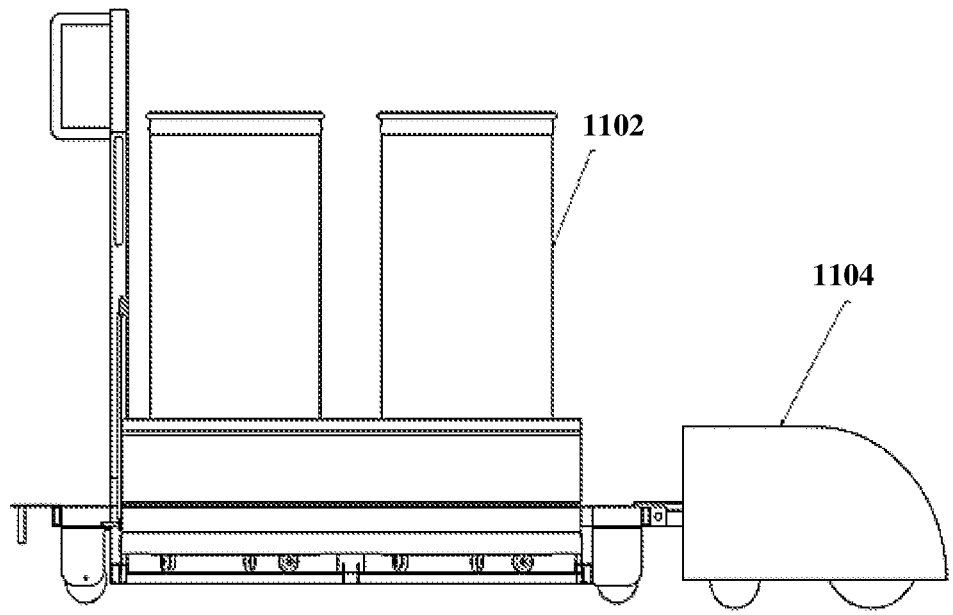
FIG. 11 illustrates an automated guided vehicle unit for carrying the containers and transporting the containers to their respective machines, according to an exemplary implementation of the present invention.

In an embodiment, the computing platform (100) has a capability to work either with manual operation mode or using an automated guided vehicle (AGV) unit (as shown in a FIG. 11). In case of the AGV unit, the computing platform (100) is configured to generate a transport order using the processing unit (112), and transmit the order to the carding machine (106) for carrying empty as well as filled containers from one machine to another machine based on the quality parameters of the material.

Further, in case of a manual mode operation, the computing platform includes a handheld device (not shown in a figure). The handheld device is configured to access and perform various functionalities of the computing platform (100). In an embodiment, the handheld device is associated with a user, where the user can be an operator who can access the computing platform (100). In one embodiment, the handheld device can be a mobile phone, a laptop, a tablet, and any other similar electronic devices. In another embodiment, the handheld device includes a scanning unit (radio-frequency identifications (RFIDs), Barcodes, or similar form of identification), an embedded computer having a Central Processing Unit (CPU)/Processor and a memory, a display unit including a display screen (Liquid Crystal Display (LCD)/Light Emitting Diodes (LED)), a wireless communication unit including Wi-Fi, 3G, LTE, Bluetooth, etc., keyboard, on-screen and/or hardware, and a rechargeable battery as a power source.

In an embodiment, the operator logins into the computing platform (100) using the handheld device by using either a finger print scanner or any other suitable mode of authentication and then automatically scan a chip (104), where a container (102) needs to be loaded or from where a container (102) needs to be unloaded. The handheld device compares a code with a lookup table of position names and show name of the position and instruct the user to scan the chip (104). Once the requisite container (102) is scanned, position and container related data transmit to the computing platform (100) using the handheld device. On receipt of confirmation from the computing platform (100), a confirmation message transmits to the operator to provide inputs to know whether the record has been updated. On completion of the duty, the operator can logout from the computing platform (100). Inactivity of more than predefined periodic time interval can cause auto-logout. In an embodiment, the handheld device is communicatively coupled with the computing platform (100) in real-time, and can buffer data during loss of communication with the computing platform (100). The handheld device is also capable of bi-directional communication with cloud based storage unit. In another embodiment, the handheld device is located within the vicinity of the computing platform (100).

In an embodiment, the computing platform (100) provides a linking between the machine and pre-defined quality parameters using pre-defined industry standard communication protocols. In another embodiment, communication protocols include Modbus, Profibus (Process Field Bus), Canbus (Controller Area Network Bus), EthernetIP, Open Platform Communications (OPC) and the like. In an embodiment, the system (102) supports one or more communication protocols with machine embedded controllers. In an embodiment, for communication, the system (102) may use at least one communication device including, but is not limited to, a Radio-frequency Identification (RFID) device, a SIM card, a chip, a barcode scanner, an optical scanner, a QR code scanner, Wi-Fi, Mind mapping, timestamp, a data scanner, or any communication signal.

In an embodiment, the computing platform (100) may perform various functionalities, such as edit machine names, user management, shift settings, tower settings, and performance management.

In another embodiment, the plurality of containers automatically moves to the required carding machines accurately.

In another embodiment, the computing platform (100) consumes less time at the same time performs the plurality of tasks accurately and efficiently.

In another embodiment, the computing platform (100) can used in multiple industrial domains.

In another implementation, the plurality of containers (102) is automatic and handle without any manpower and human intervention.

Figure 2:
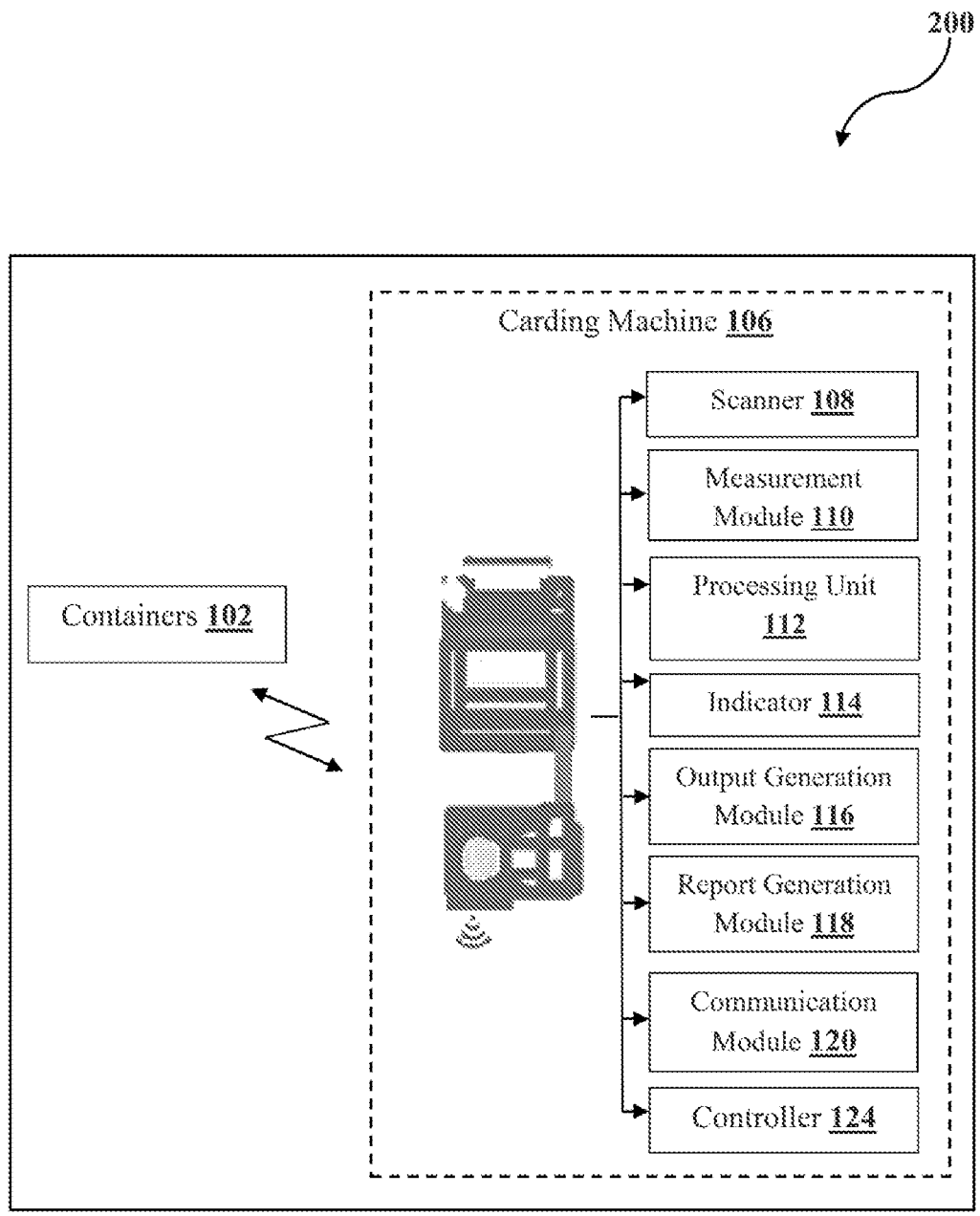
FIG. 2 illustrates a schematic diagram depicting a plurality of containers with a carding machine, according to an exemplary implementation of the present invention.

FIG. 2 illustrates a schematic diagram (200) depicting a plurality of containers with a carding machine, according to an exemplary implementation of the present invention.

In an embodiment, the computing platform (100) includes a plurality of containers (102) that are equipped with a carding machine (106) using a smart technology. These containers (102) are used in an industrial automation environment.

In another implementation, the computing platform (100) is configured to perform a plurality of tasks with the help of the container (102). In an embodiment, the container (102) can be a can, a drum, and the like. The carding machine (106) includes the scanner (108), the measurement module (110), the processing unit (112), the indicator (114), the output generation module (116), the report generation module (118), the communication module (120), and the controller (124).

The scanner (108) is configured to scan the position/location of the container (102). If the can is near to the carding machine (106), the scanner (108) is configured to detect the position of the container (102) and is also configured to scan the chip of the container (102) and detect and read the information of the container (102). The controller (124) is configured to control various modules of the carding machine (106). In an embodiment, the controller (124) is configured to generate machine processing commands. In an embodiment, the controller (124) may be implemented as one or more microcontrollers, central processing units, state machines, logic circuitries, and/or any devices that manipulate signals based on operational instructions. The indicator (114) is configured to generate an indicating signal based on the positioning of the container (102). In an embodiment, the indicator (114) can be a LED (Light Emitting Diode) indicator. In one embodiment, the carding machine (106) can include a plurality of LED indicators.

In another implementation, the computing platform (100) includes wired or wireless networks (not shown in figure). Examples of the wired networks include, but are not limited to, a Wide Area Network (WAN) or a Local Area Network (LAN), a client-server network, a peer-to-peer network, and so forth. Examples of the wireless networks include, but are not limited to, Wi-Fi, a Global System for Mobile communications (GSM) network, and a general Packet Radio Service (GPRS) network, an enhanced data GSM environment (EDGE) network, 802.5 communication networks, Code Division Multiple Access (CDMA) networks, or Bluetooth networks. In an example, the communication network may be a combination of one or more wired and/or wireless networks.

FIG. 3 illustrates data filled information (300) captured by a carding machine of FIG. 2, according to an exemplary implementation of the present invention.

In FIG. 3, all the data related to the container (102), material associated with the container (102), and the carding machine (106), is updated automatically. Further, the data such as the details of the raw material, the type of raw material, the length of the raw material, the weight of the raw material, and the like is updated automatically. When a particular carding machine (106) is selected, a display screen (not shown in a figure) of the carding machine (106) is configured to display all the details associated with that particular carding machine (106). In an embodiment, these details can also be provided by the processing unit (112). In an exemplary embodiment, if the container (102) moves from one workstation to next workstation (for example BDF1, BDF2), or from one machine to another machine, then the data related to the movement of the container (102) to the particular carding machine are automatically updated display on the display screen. In an embodiment, when all the data is added and updated, the computing platform (100) automatically assigns the defined characteristics to all the respective carding machines.

Figure 4:
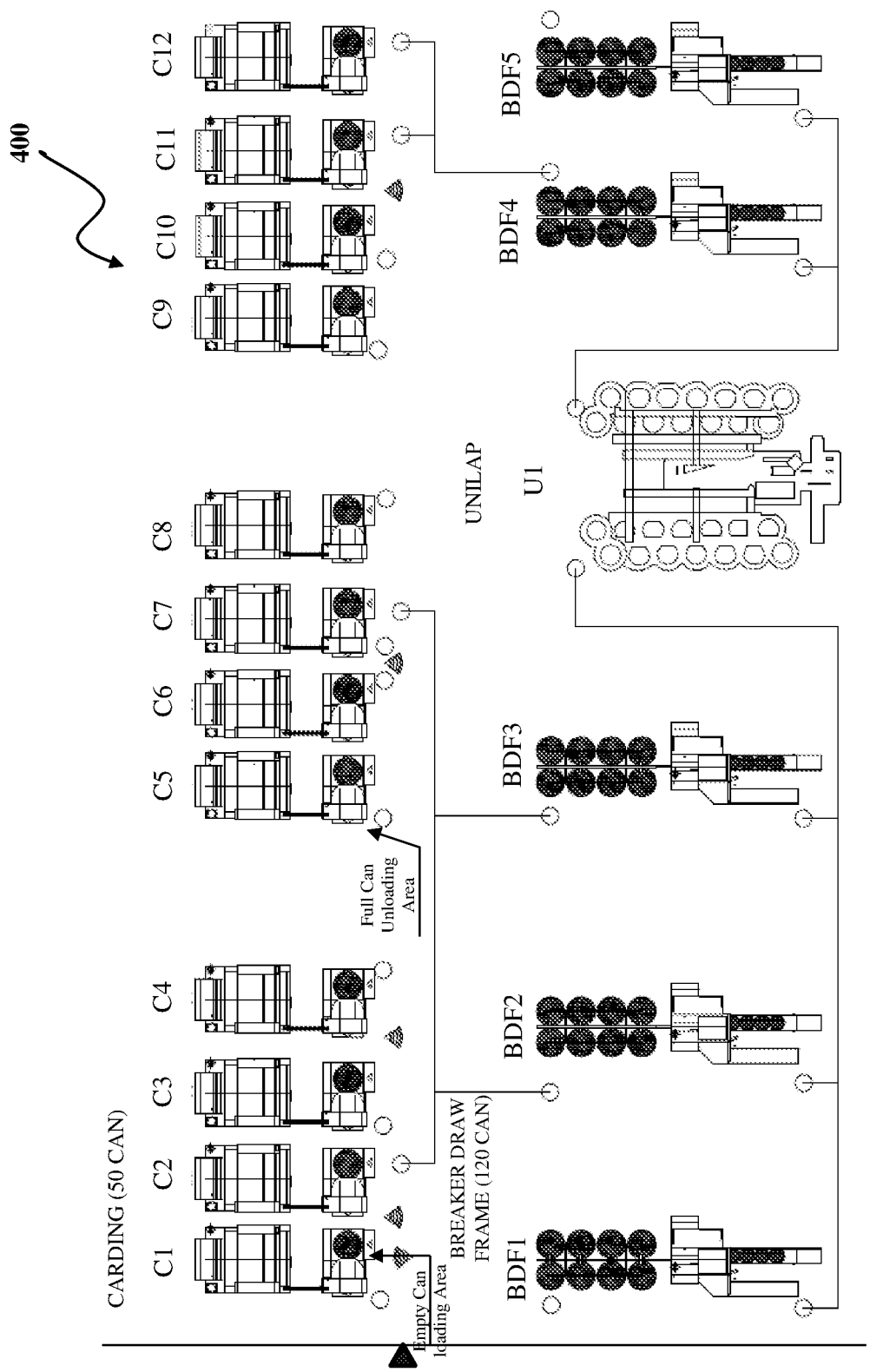
FIG. 4 illustrates a schematic diagram of a spinning industry machine comprising a plurality of carding machines and a plurality of breaker draw frames, according to an exemplary implementation of the present invention.

FIG. 4 illustrates a schematic diagram (400) of a spinning industry machine comprising a plurality of carding machines and a plurality of breaker draw frames, according to an exemplary implementation of the present invention.

FIG. 4 illustrates a schematic diagram (400) of a spinning industry machine comprising plurality of carding machines (C1, C2, C3 . . . C12) and plurality of breaker draw frames (BDF1, BDF2, BDF3, BDF4, BDF5), according to an exemplary implementation of the present invention. In the present implementation, if the can moves near the carding machine (C1), then the scanner (108) of the carding machine (C1) is configured to scan the chip (104) of the can. The scanner (108) of the carding machine (C1) is further configured to transmit the scanned data to the measurement module (110), wirelessly. On receiving the scanned data, the measurement module (110) is configured to measure the quality of the material filled in the can. The processing unit (112) is further configured to check the carding machine (C1) and assigns all the stored characteristics of the carding machine (C1) to the can's chip (104) having the measured quality of material. In an embodiment, the can is further configured to move to the pre-defined breaker draw frame machine or station, as soon as the chip (104) of the can is updated with the characteristics of the respective carding machine. As the can is moved to the next breaker draw frame machine (BDF2), the chip (104) automatically updates data. Each of the scanner (108) of the respective breaker draw frame machines scans the can's chip (104) and transmit the scanned data to the measurement module (110). In an embodiment, the processing unit (112) is configured to process the measured quality of the material filled in the can and data and indicate that the can is positioned at the respective machine or station, for example, BDF1 in this case or at any other station. The breaker draw frame machine or station is further configured to blink the green or red LED indicator depending on the position of the container (102). In this scenario, if the signal received by the processing unit (112) is from the correct carding machine or station, the processing unit (112) is configured to accept the can's data and store the data related to the can in the database (122) or a data logger (not shown in figure) for future access. Meanwhile, the indicator (114) is configured to transmit a signal to BDF1 to blink the green LED indicator, which indicates that the can is placed at the correct position. In an embodiment, the machine provides blink red LED indicator, which indicates that the can is placed at the wrong position and the can has to be moved to the right machine or station. The similar process applies for all the carding machines.

Figure 5:
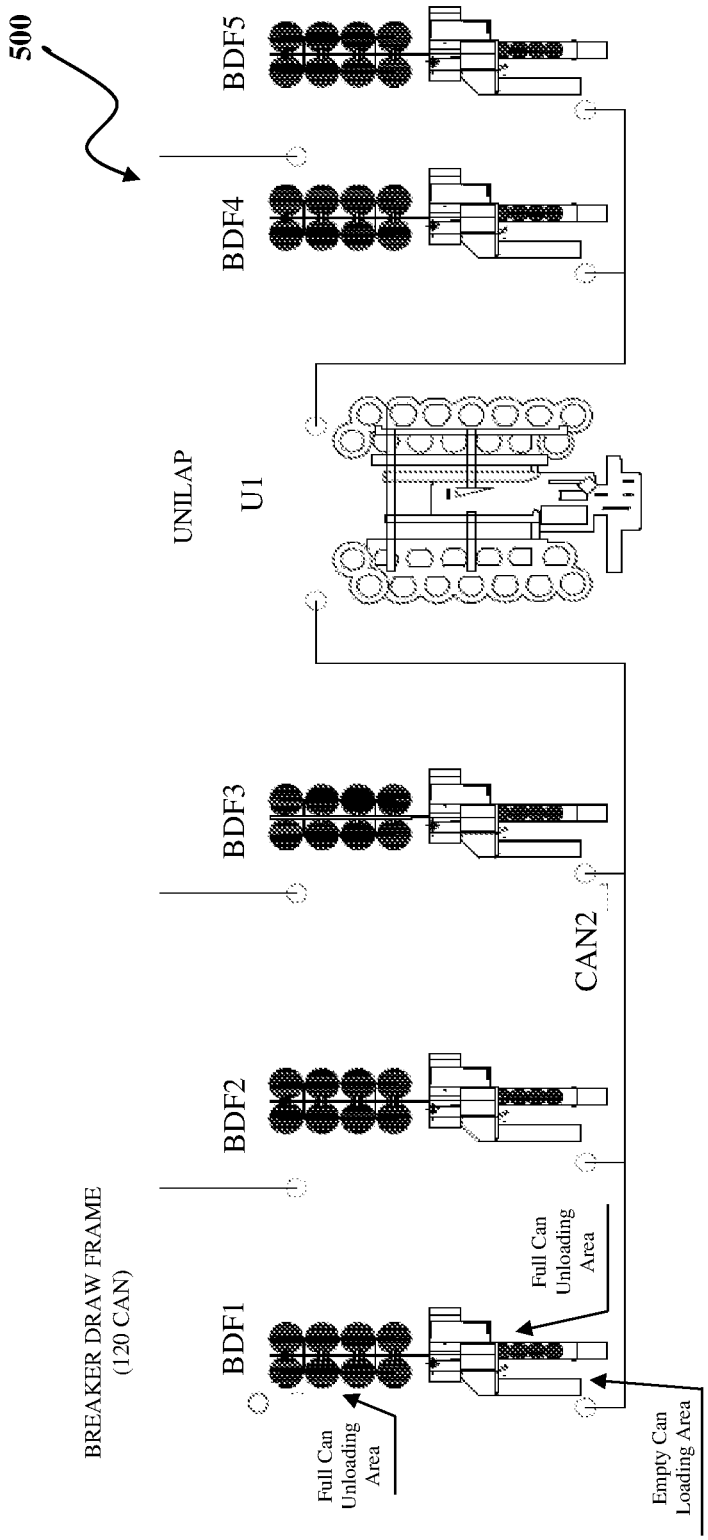
FIG. 5 illustrates a schematic diagram of the output side of a breaker draw frame, according to an exemplary implementation of the present invention.

FIG. 5 illustrates a schematic diagram (500) of the output side of a breaker draw frame, according to an exemplary implementation of the present invention.

In FIG. 5, a can2 moves near breaker draw frame (BDF). A scanner (108) of BDF3 is configured to scan the microchip of the can2. The scanner (108) of BDF3 is further configured to transmit the scanned data to the measurement module (110), wirelessly. On receiving the scanned data, the measurement module (110) is configured to measure the quality of material filled in the can2. The processing unit (112) is configured to assign all the stored characteristics of BDF3 to the chip of can2. If the can2 moves to the predefined machine or station, the microchip of the can2 automatically updates the characteristics of BDF3. In this scenario, the processing unit (112) has a predefined position related data, wherein the can2 moves to the unilap machine U1. As the can2 is moved to the next machine or station (U1), the scanner (108) of U1 is configured to scan the microchip of can2 and transmit the scanned data to the measurement module (110). Further, the processing unit (112) processes the can2 and updates that the can2 is at the unilap machine or station i.e. U1, or at any other station. The unilap machine or station (U1) is further configured to blink the green or red LED indicators depending on the position of the can2. In this scenario, if the signal received by the processing unit (112) is from the correct machine or station, the processing unit (112) is configured to accept the can2 data and store all the data related to the can2, in the database (122) or the data logger for future access. Meanwhile, the indicator (114) is configured to send signal to U1 to blink the green LED indicator, which indicates that the can2 is placed at the correct position. In an embodiment, if the processing unit (112) receives a signal, from any other machine, the indicator (114) is configured to send back the signal accordingly, and to make U1 blink red LED indicator, which indicates that the can2 is placed at the wrong position, and the can2 has to be moved to the right machine or station. The similar process applies for all the breaker draw frame machines.

Figure 6:
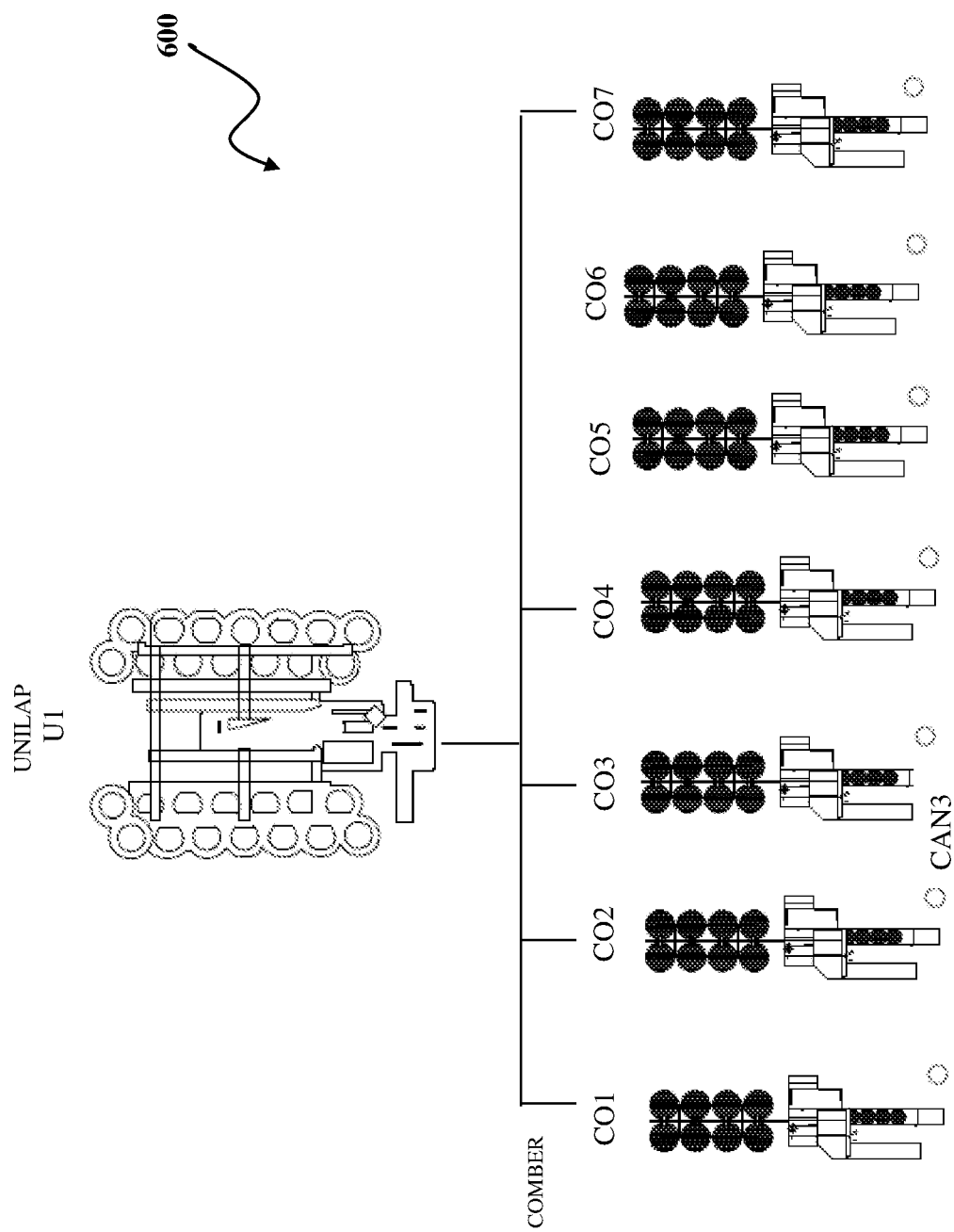
FIG. 6 illustrates a schematic diagram of the output side of a unilap, according to an exemplary implementation of the present invention.

FIG. 6 illustrates a schematic diagram (600) of the output side of a unilap, according to an exemplary implementation of the present invention.

In FIG. 6, a bobbin moves near unilap for winding. A scanner of U1 is configured to scan the chip of the bobbin. The scanner of U1 is further configured to transmit the scanned data to the measurement module (110), wirelessly. The measurement module (110) is configured to measure the quality of material filled in a bobbin. On receiving the measured quality of material filled in the bobbin, the processing unit (112) is configured to check an unilap from which the data has received and assign all the stored characteristics of U1 to the chip of bobbin. If the bobbin moves to the predefined machine or station, the chip of the bobbin automatically updates the characteristics of U1. In this scenario, the processing unit (112) has a predefined position related data, wherein the bobbin moves to the comber machines CO1, CO2 to CO7. As the bobbin is moved to the next machine or station, (CO1, CO2 to CO7), the scanner of CO1 is configured to scan the chip of bobbin and transmit the scanned data to the measurement module (110). The processing unit (112) processes the measured data and updates that the bobbin is at the comber machine or station i.e. CO1, or at any other station. The comber machines or stations (CO1, CO2 to CO7) are further configured to blink the green or red LED indicators depending on the position of the bobbin. In this scenario, if the signal received by the processing unit (112) is from the correct machine or station, the processing unit (112) is configured to accept the bobbin data and store all the data related to the bobbin, in the database (122) or the data logger for future access. Meanwhile, the indicator (114) is configured to send signal to CO1 to blink the green LED indicator, which indicates that the bobbin is placed at the correct position. In an embodiment, if the processing unit (112) receives a signal, from any other machine, the indicator (114) is configured to send back the signal accordingly, and to make CO1 blink red LED indicator, which indicates that the bobbin is placed at the wrong position, and the bobbin has to be moved to the right machine or station. The similar process applies for all the comber machines.

Figure 7:
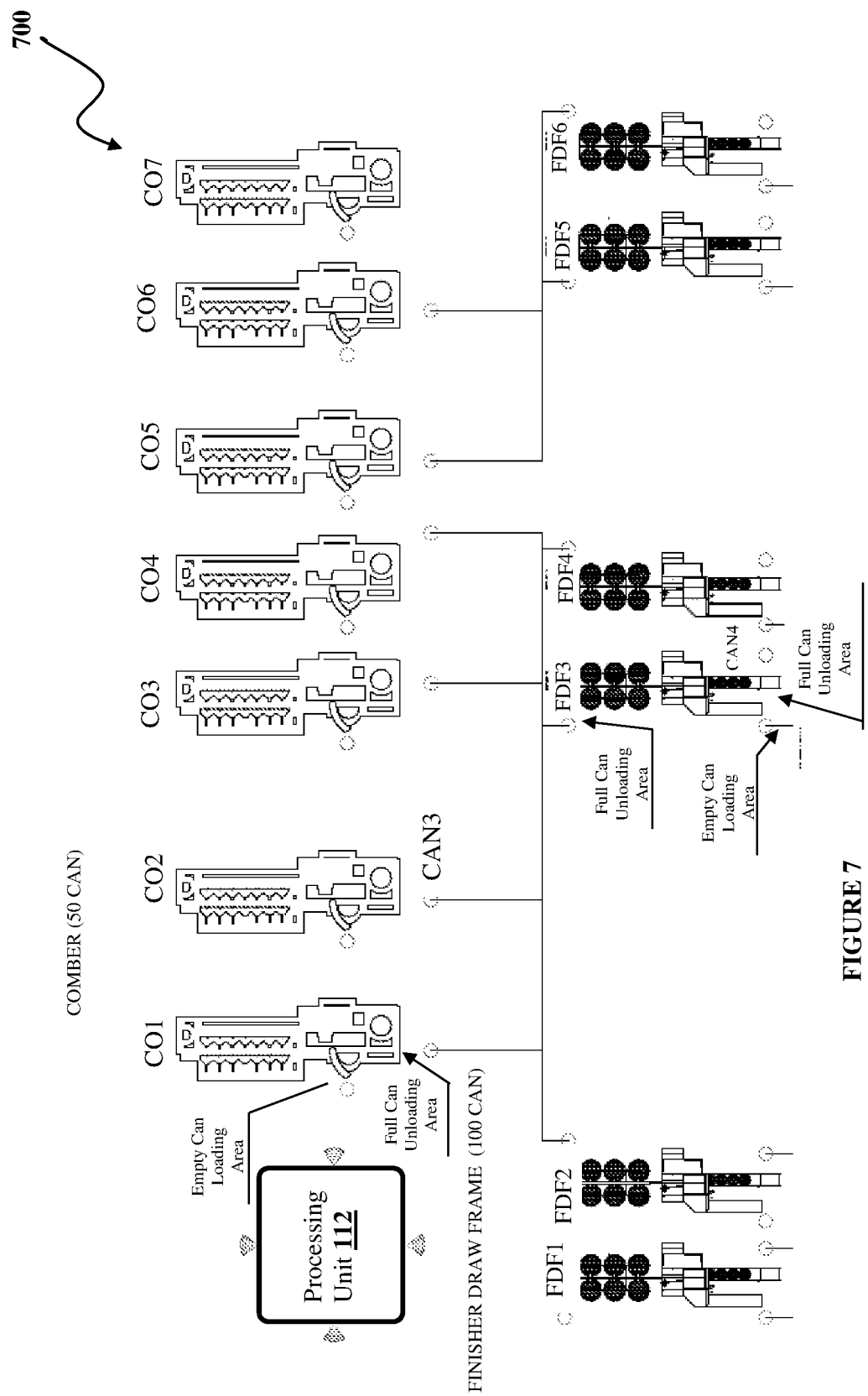
FIG. 7 illustrates a schematic diagram of the output side of a comber, according to an exemplary implementation of the present invention.

FIG. 7 illustrates a schematic diagram (700) of the output side of a comber, according to an exemplary implementation of the present invention.

In FIG. 7, a can3 moves near comber CO2. A scanner of CO2 is configured to scan the chip of the can3. The scanner of CO2 is further configured to transmit the scanned data to the measurement module (110). On receiving the scanned data, the measurement module (110) is configured to measure the quality of the material filled in the can3. The processing unit (112) is configured to assign all the stored characteristics of CO2 to the chip of can3. If the can3 moves to the predefined machine or station, the chip of the can3 automatically updates the characteristics of CO2. In this scenario, the processing unit (114) has a predefined position related data, wherein the can3 moves to the finisher draw frame machines FDF2 and FDF3. As the can3 is moved to the next machine or station (FDF2), the scanner of FDF2 is configured to scan the chip of can3 and to transmit the scanned data to the measurement module (112). The processing unit (114) then processes the measured can3, and updates the can3 is at the finisher draw frame machine or station i.e. FDF2 or at any other station. The machine or station is further configured to blink the green or red LED indicators depending on the position of the can3. In this scenario, if the signal received by the indicator (114) is from the correct machine or station, the processing unit (112) is configured to accept the can3 and to store all the data related to can3, in a data logger for future access. Meanwhile, the indicator (114) is configured to send signal to FDF2 to blink the green LED indicator, which indicates that the can3 is placed at the correct position. In an embodiment, if the processing unit (112) receives a signal from any other machine, the indicator (114) is configured to send back the signal accordingly and to make FDF2 blink red LED indicator, which indicates that the can3 is placed at the wrong position and the can3 has to be moved to the right machine or station. The similar process applies for all the comber machines.

Figure 8:
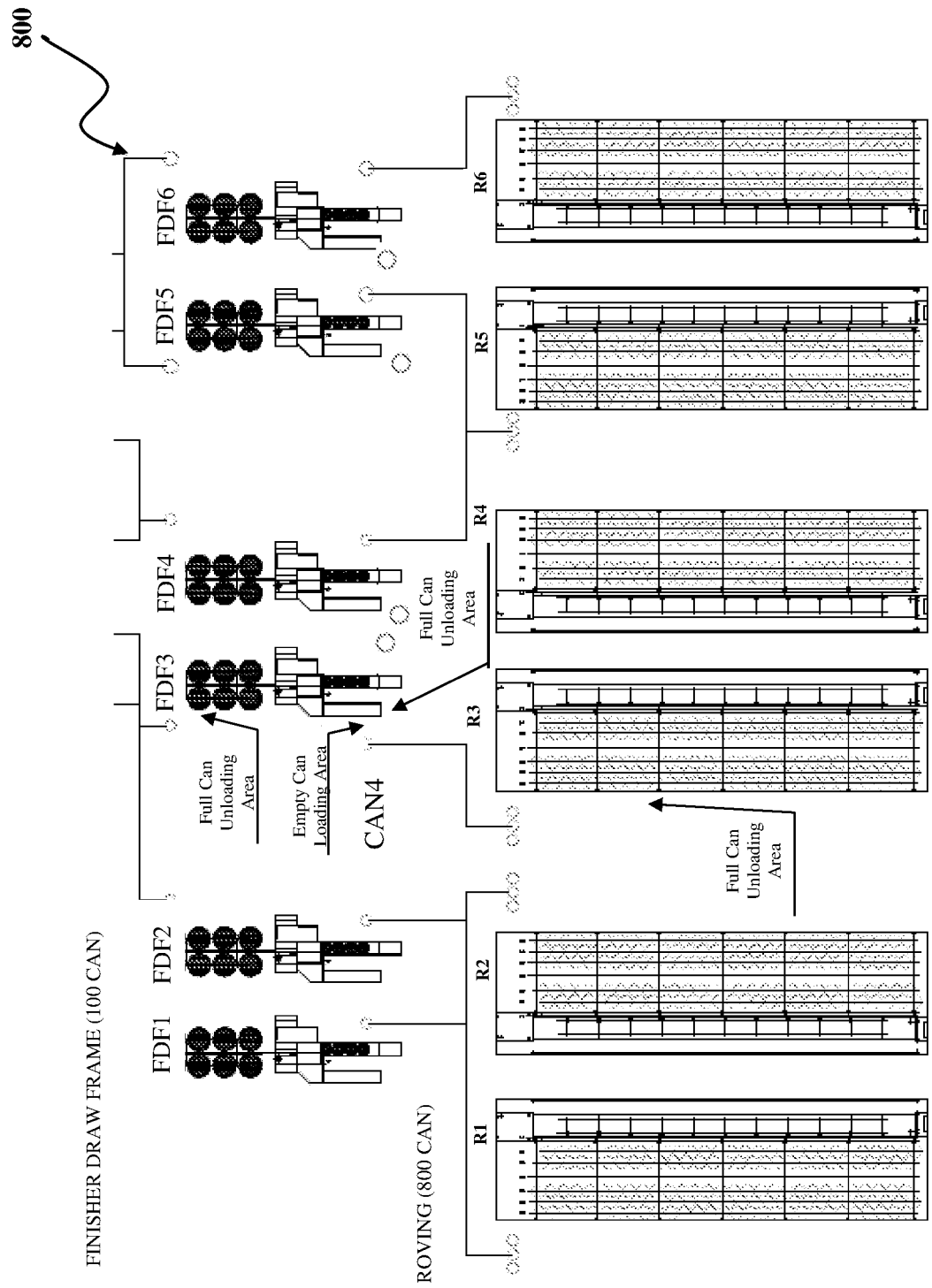
FIG. 8 illustrates a schematic diagram of the output side of a finisher draw frame and input side of roving as well as output side of roving, according to an exemplary implementation of the present invention.

FIG. 8 illustrates a schematic diagram (800) of the output side of a finisher draw frame and input side of roving as well as output side of roving, according to an exemplary implementation of the present invention.

In FIG. 8, a can4 moves near finisher draw frame FDF3. A scanner of FDF3 is configured to scan the chip of the can4. The scanner of FDF3 is further configured to transmit the scanned data to the measurement module (110), wirelessly. On receiving the scanned data, the measurement module (110) is configured to measure the quality of the material filled in the can4. The processing unit (114) is configured to assign all the stored characteristics of FDF3 to the chip of can4. If the can4 moves to the predefined machine or station, the chip of the can4 automatically updates the characteristics of FDF3. In this scenario, the processing unit (114) has a pre-defined position related data, wherein the can4 moves to the roving machineR3. As the can4 is moved to the next machine or station (R1, R2, R3, R4, R5, R6), the scanner at the particular machines or stations are configured to scan the chip of can4, and further configured to transmit the scanned data to the measurement module (110). The processing unit (114) processes the measured can4 and updates that the can4 is at the roving machine or station i.e. R3 or at any other station. The machine or station is further configured to blink the green or red LED indicators depending on the position of the can4. In this scenario, if the signal received by the processing unit (112) is from the correct machine or station, the processing unit (112) is configured to accept the can4 and to store all the data related to the can4, in the database (120) or the data logger for future access. Meanwhile, the indicator (114) is configured to send signal to R3 to blink the green LED indicator which indicates that the can4 is placed at the correct position. In an embodiment, if the processing unit (114) receives a signal from any other machine, the indicator (114) is configured to send back the signal accordingly and to make R3 blink red LED indicator, which indicates that the can4 is placed at the wrong position and the can4 has to be moved to the right machine or station. The similar process applies for all the finisher draw frame machines.

Further, In FIG. 8, at a time, containers move near roving R1. A scanner of R1 is configured to scan the chip of all containers. The scanner of R1 is further configured to transmit the scanned data to the measurement module (110), wirelessly. On receiving the scanned data, the measurement module (110) is configured to measure the quality of material filled in the container. The processing unit (112) is configured to assign all the stored characteristics of R1 to the chips of the containers. If the containers move to the predefined machine or station, the chip of the containers automatically updates the characteristics of R1. In this scenario, the processing unit (112) has a predefined position related data, wherein the cans move to the roving machine R1. Output of the R1 machine is in the form of bobbins which are transported in overhead automatic transporting mechanism. As the bobbins are filled with silver of respective containers, all bobbins will be moved to next machine in automatic manner via an overhead transporting system. On filling of the bobbins, scanners on roving (R1, R2, to R6) are placed in such a way that all the microchips of the bobbins will be scanned, and data will be sent wirelessly to the measurement module (110). The scanner at the particular machine or station is configured to scan the microchip of all bobbins that are moving to next possible machine. The processing unit (112) processes the measured quality of material filled in the bobbins, and updates that the bobbins are at the roving machine or station i.e. R1 or at any other station. The machine or station is further configured to blink the green LED indicators. In this scenario, if the signal received by the processing unit (112) is from the correct machine or station, the processing unit (112) is configured to accept the received signals and to store all the data related to the bobbins, in the database or the data logger for future access. The similar process applies for all roving machines. Furthermore, 200 bobbins coming out of roving will move to a ring frame via an overhead transporting system. Each ring frame has at a time 2000 spindle. Using the processing unit (112), a number of bobbins placed at which spindle, identified.

Figure 9:
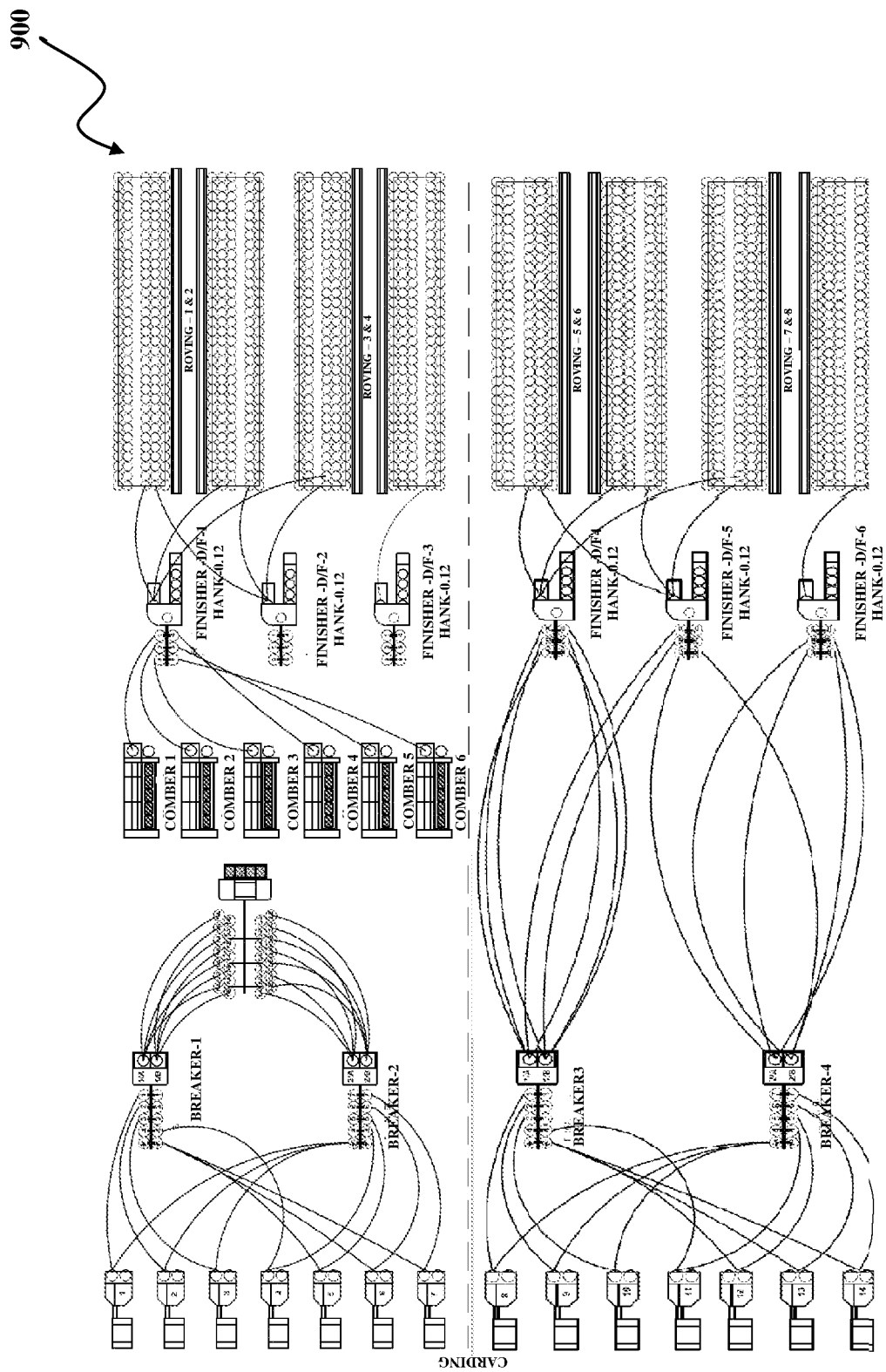
FIG. 9 illustrates a schematic diagram depicting a mill line configuration, according to an exemplary implementation of the present invention.

FIG. 9 illustrates a schematic diagram depicting a mill line configuration, according to an exemplary implementation of the present invention.

In FIG. 9, a mill configuration (900) includes a line configuration along with a pattern configuration define rules or criteria on which the plurality of machines' (106) output may go to as which another machine's input. In an embodiment, the line configuration and the pattern configuration have a flexibility to define inputs from one or more machines to go into an input position of a destination machine. The computing platform (100) by using a report generation module (118) is configured to generate a graphical report depicted by direct lines emanating from a source machine to a particular position of a destination machine. In an embodiment, the computing platform (100) configures a mill by providing a library of machine objects. The library is stored in the database (122). In another embodiment, a user may select a machine by clicking an image of the machine objects from the library, and dragging it onto an area earmarked for showing configured machines in the mill and then leaving it there. This may prompt to the user to enter a number of machines together with some parameters such as a number of input positions and a number of output positions. In one embodiment, the user may enter such details using the input module.

In an exemplary embodiment, the computing platform (100) is configured to define a pattern for the pattern configuration in which input side containers may be loaded. The computing platform (100) then allows only those containers coming from a particular machine, for example one mill has 10 carding machines and 2 breaker machines. A user (for example, a mill owner) wants to run two different lines with 5 carding machines, where each carding machines feed each of the breaker machines. In such a case, the carding machines 1, 2, 3, 4, and 5 will be feeding a breaker machine 1 in a particular pattern. Similarly, other machines follow the breaker machines will also have a same pattern.

In an exemplary embodiment, the computing platform (100) is configured to authenticate the user by providing login credentials. In an embodiment, only an authenticated user can operate the computing platform (100). The user then starts with defining a mill configuration, for example, as shown in FIG. 9. The configuration includes a number of machines, where each type of machine is configured along with applicable/ suitable associated parameters, such as input positions and output positions. The mill configuration is to be followed by a line configuration, where the type of a line is firstly selected. In an embodiment, the lines are pre-defined. The lines include ring spinning (Carded), ring spinning (Combed), rotor spinning (Open end), Vortex, and Airjet. The user may select one of the lines and then the computing platform (100) displays by using an interfacing unit (not shown in a figure) the pre-defined machine types in the type of the line configuration. The user then has to select machines, which are already defined in the mill configuration, in each of the machine types. After selecting the machine, the user has to define the connection between the selected machines. After defining the connection, a pattern is defined by the user. Once, all the patterns have been defined, the configured lines are to be run. A display page on the interfacing unit shows all the running lines along with cans' identification numbers for each of the available positions. The computing platform (100) then defines sliver quality and sliver waste related information, and generate an alert to the user. Thereafter, the computing platform (100) generates one or more reports.

Figure 10:
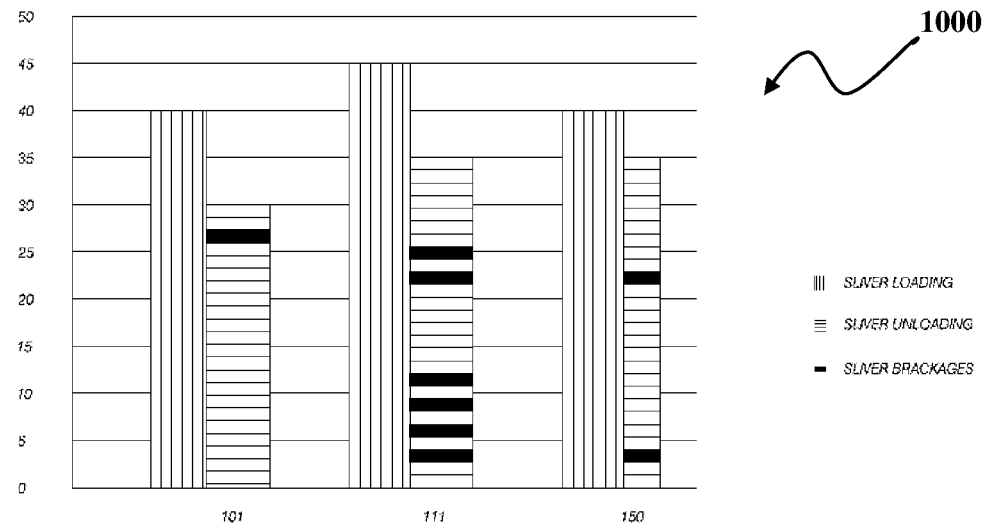
FIG. 10 illustrates a graphical representation depicting quality parameters interface commutation of machines with cans/containers, according to an exemplary implementation of the present invention.

FIG. 10 illustrates a graphical representation (1000) depicting quality parameters interface commutation of machines with cans/containers, according to an exemplary implementation of the present invention.

In an exemplary embodiment, the computing platform (100) is configured to detect quality parameters of the material filled in a can, such as:

Material Process: 100% Cotton
Mixing detail: Sinker 6
Hank/Ne: 0.11
Length of Sliver: 9000 m
Sliver Weight 48 kg
Can Size 1000*1200 mm
Sliver U % 1.98
Sliver CVM 3.01
Sliver Weight 150 mm The computing platform (100) then measures quality of material filled in the can. The computing platform (100) generates a report based on processed container. Table 1 illustrates a generated report:

| Can No. | Can IN & OUT Sliver loading time | Can Doffing time (min) | Length of Sliver (m) | Ideal Can standing time | First Passage Machine No. (Input Can) | Can IN & OUT Sliver loading time | Sliver Unwinding time (min) | No. of Sliver breakages | Fault detection on information |
|---|---|---|---|---|---|---|---|---|---|
| 101 | 11:00 to 11:40 | 40 | 9000 | 30 Hrs. | 5 | 12:45 to 01:15 | 30 | 1 | — |
| 111 | 11:45 to 12:30 | 45 | 9000 | 10 Hrs. | 5 | 12:35 to 01:07 | 32 | 6 | — |

-continued

| Can No. | Can IN & OUT Sliver loading time | Can Doffing time (min) | Length of Sliver (m) | Ideal Can standing time | First Passage Machine No. (Input Can) | Can IN & OUT Sliver loading time | Sliver Unwinding time (min) | No. of Sliver breakages | Fault detection on information |
|---|---|---|---|---|---|---|---|---|---|
| 150 | 12.35 to 01:15 | 40 | 9000 | 4 Hrs. | 6 | 01:20 to 01:50 | 30 | 2 | — |

The Sliver loading, Sliver unloading, and Sliver breakages are shown, in FIG. 10.

FIG. 11 illustrates an automated guiding vehicle (1100) for carrying the containers and transporting the containers to their respective machines, according to an exemplary implementation of the present invention.

In the present implementation, automated guiding vehicle (1100) comprises a vehicle with caster wheels and the vehicle is connected to the automatic robot (1104) by a latch. The automated guiding vehicle (1100) is configured to carry the containers (1102) and move from one machine to the other machine automatically. In an embodiment, the automated guiding vehicle (1100) is configured to carry a container (1102) and move from one storage area to other automatically. The automated guiding vehicle (1100) is further configured to load and unload the container (1102) to particular machines.

FIG. 12 illustrates a flowchart depicting a method for movement of one or more containers in a computing platform, according to an exemplary implementation of the present invention.

The flowchart (1200) starts at a step (1202), storing, in a chip (104), container related data of an associated container (102). In an embodiment, each of a container (102) from a plurality of containers includes a chip (104), where the chip (104) is configured to store container related data of an associated container (102). At a step (1204), scanning, by a scanner (108), the chip (104) associated with the container (102). In an embodiment, a scanner (108) is configured to scan the chip (104) associated with the container (102). At a step (1206), detecting, by the scanner (108), placement related data of the container (102), and information pertaining to quality parameters of associated material filled in the container (102). In an embodiment, the scanner (108) is configured to detect placement related data of the container (102), and information pertaining to quality parameters of associated material filled in the container (102). At a step (1208), storing, in a database (122), pre-defined characteristics of one or more carding machines (106), pre-defined values of quality parameters, pre-determined criteria for identifying quality of material, and detected information pertaining to quality parameters. In an embodiment, a database (122) is configured to store pre-defined characteristics of one or more carding machines (106), pre-defined values of quality parameters, pre-determined criteria for identifying quality of material, and detected information pertaining to quality parameters. At a step (1210), measuring, by a measurement module (110), the quality of material filled in the container (102) using the stored pre-defined values of quality parameters, and the pre-determined criteria. In an embodiment, a measurement module (110) is configured to measure the quality of material filled in the container (102) using the stored pre-defined values of quality parameters, and the pre-determined criteria. At a step (1212), assigning, by a processing unit (112), the stored pre-defined characteristics of a carding machine (106) to the chip (104) of the container (102) having the measured quality of material. In an embodiment, a processing unit (112) is configured to assign the stored pre-defined characteristics of a carding machine (106) to the chip (104) of the container (102) having the measured quality of material. At a step (1214), processing, by the processing unit (112), the container (102) from the assigned carding machine (106) to a second carding machine. In an embodiment, the processing unit (112) is configured to process the container (102) from the assigned carding machine (106) to a second carding machine. At a step (1216), generating, by an indicator (114), an indicating signal based on the processed container (102). In an embodiment, an indicator (114) is configured to generate an indicating signal based on the processed container (102). At a step (1218), generating, by an output generation module (116), an output based on the generated indicating signal, the measured quality, and the assigned characteristics. In an embodiment, an output generation module (116) is configured to generate an output based on the generated indicating signal, the measured quality, and the assigned characteristics. At a step (1220), generating, by a report generation module (118), a report based on the generated output. In an embodiment, a report generation module (118) is configured to generate a report based on the generated output.

It should be noted that the description merely illustrates the principles of the present invention. It will thus be appreciated that those skilled in the art will be able to devise various arrangements that, although not explicitly described herein, embody the principles of the present invention. Furthermore, all examples recited herein are principally intended expressly to be only for explanatory purposes to help the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for movement of one or more containers (102) in a computing platform (100), said method comprising:
   storing, in a chip (104), container related data of an associated container (102);
   scanning, by a scanner (108), said chip associated with said container (102);
   detecting, by said scanner (108), placement related data of said container (108), and information pertaining to quality parameters of associated material filled in said container (108);
   storing, in a database (122), pre-defined characteristics of one or more carding machines (106), pre-defined values of quality parameters, pre-determined criteria for identifying quality of material, and detected information pertaining to quality parameters;

measuring, by a measurement module (110), said quality of material filled in said container (102) using said stored pre-defined values of quality parameters, and said pre-determined criteria;

assigning, by a processing unit (112), said stored pre-defined characteristics of a carding machine (106) to said chip (104) of said container (102) having said measured quality of material;

processing, by said processing unit (112), said container (102) from said assigned carding machine (102) to a second carding machine; generating, by an indicator (114), an indicating signal based on said processed container (102);

generating, by an output generation module (116), an output based on said generated indicating signal, said measured quality, and said assigned characteristics; and carrying, by an automated guided vehicle (AVG) unit (1100), said container (102), and transporting said container (102) to said second carding machine.

2. The method as claimed in claim 1, wherein said method includes identifying container's position, properties of material, material quality, weight of the material, length of the material, and other parameters of the material, and storing identified container related data in said chip (104).

3. The method as claimed in claim 1, wherein said method includes updating said container related data with the characteristics of the carding machine (106), if said container (102) is processed to said second carding machine.

4. The method as claimed in claim 1, wherein said method includes scanning the chip (104) of said container (102), and transmitting the scanned data, if the updated container (102) is processed to said second carding machine.

5. The method as claimed in claim 1, wherein said method includes receiving and processing the scanned data and confirming that the container (102) is at said second carding machine.

6. The method as claimed in claim 1, wherein said method includes accepting the container related data and storing all the data related to the container (102) in said database (122).

7. The method as claimed in claim in claim 1, wherein generating said output further includes generating an output by providing a first indicating value when said container (102) is placed at the correct position.

8. The method as claimed in claim in claim 1, wherein generating said output further includes generating an output by providing a second indicating value when said container (102) is placed at the wrong position, and an indication to place said container at correct position.

9. The method as claimed in claim 1, wherein said method includes checking, by said measurement module (110), whether said container (102) is fit enough to go to next carding machine (106) based on said measured quality.

10. The method as claimed in claim 9, wherein said method includes:

generating, by an alert generation module (128), an alert for stopping processing of said container (102) from said carding machine (106) to said second carding machine, if said container (102) contains bad quality material;

recommending, by a recommendation module (130), maintaining desired quality of material filled in said container (102), to said user.

11. The method as claimed in claim 1, wherein said method includes generating, by a report generation module (118), a report based on said generated output and said generated alert.

12. The method as claimed in claim 1, wherein said method includes predicting, by a prediction module (132), said quality of material filled in said container (102) associated with said carding machine (106).

13. The method as claimed in claim 11, wherein said report includes an ageing report, a material wastage report, a material breakages report, a material flow report, a fault prediction report, an alarm/ alert/ event report, a container traceability report, a machine traceability report, and a fault detection report.

14. The method as claimed in claim 1, wherein said method includes accessing, by a handheld device, said computing platform (100), and performing functionalities on said computing platform (100).

15. A computing platform (100) for movement of one or more containers (102), said computing platform comprising:

a plurality of containers (102), wherein each container (102) includes a chip (104) having container related data;

one or more carding machines (106) configured to cooperate with said plurality of containers (102), said one or more carding machines (106) comprising:

a scanner (108) configured to scan said chip (104) associated with said container (102), and detect placement related data of said container (102), and information pertaining to quality parameters of associated material filled in said container (102); and a database (122) configured to store pre-defined characteristics of said one or more carding machines (106), pre-defined values of quality parameters, pre-determined criteria for identifying quality of material, and detected information pertaining to quality parameters;

a measurement module (110) configured to cooperate with said scanner (108) and said database (122), said measurement module (110) configured to measure said quality of material filled in said container (102) using said stored pre-defined values of quality parameters, and said pre-determined criteria;

a processing unit (112) configured to cooperate with said measurement module (110) and said database (122), said processing unit (112) configured to assign said stored pre-defined characteristics of said carding machine (106) to said chip (104) of said container (102) having said measured quality of material, and process said container (102) from said assigned carding machine (106) to a second carding machine;

an indicator (114) configured to cooperate with said processing unit (112), said indicator (114) configured to generate an indicating signal based on the processed container (102);

an output generation module (116) configured to cooperate with said measurement module (110), said processing unit (112), and said indicator (114), said output generation module (116) configured to generate an output based on said generated indicating signal, said measured quality, and said assigned characteristics; and an automated guided vehicle (AVG) unit (1100) configured to carry said container (102), and transport said container (102) to said second carding machine (106).

16. The computing platform (100) as claimed in claim 15, wherein said one or more carding machines (106) includes a communication module (120) configured to receive said container related data from said plurality of containers (102).

17. The computing platform (100) as claimed in claim 15, wherein said communication module (120) is configured to transmit said generated indicating signal to said output generation module (116).

18. The computing platform (100) as claimed in claim 15, wherein said one or more carding machines (106) includes a controller (124) configured to cooperate with said scanner (108), said measurement module (110), said processing unit (112), said indicator (114), said output generation module (116), said report generation module (118), and said communication module (120), said controller (124) configured to control functionalities of said scanner (108), said measurement module (110), said processing unit (112), said indicator (114), said output generation module (116), said report generation module (118).

19. The computing platform (100) as claimed in claim 15, wherein said chip (104) is configured to identify container's position, properties of material, material quality, weight of the material, length of the material, and other parameters of the material, and is further configured to store identified data.

20. The computing platform (100) as claimed in claim 15, wherein said computing platform (100) includes other machines including a breaker draw frame machine, a unilap machine, a comber machine, a finisher draw frame machine, and a roving machine.

21. The computing platform (100) as claimed in claim 15, wherein said computing platform (100) includes an updater (126) configured to update said container related data stored in the chip (104) with the characteristics of the carding machine (106), if said container (102) is processed to said second carding machine.

22. The computing platform (100) as claimed in claim 21, wherein if said container related data is updated with the characteristics of the carding machine (106), then said container (102) is processed to said second carding machine.

23. The computing platform (100) as claimed in claim 15, wherein said scanner (108) is configured to scan the chip (104) associated with the container (102), and transmit the scanned data to the processing unit (114), as the updated container (102) is processed to said second carding machine.

24. The computing platform (100) as claimed in claim 15, wherein said processing unit (112) configured to receive the scanned data and process the scanned data and confirm that the container (102) is at said second carding machine.

25. The computing platform (100) as claimed in claim 15, wherein said processing unit (112) is configured to accept the container related data and store all the data related to the container (102) in said database (122).

26. The computing platform (100) as claimed in claim 15, wherein said output generation module (116) is configured to generate an output by providing a first indicating value when said container (102) is placed at the correct position.

27. The computing platform (100) as claimed in claim 15, wherein said output generation module (116) is configured to generate an output by providing a second indicating value when said container (102) is placed at the wrong position, and further configured to generate an indication to place said container (102) at correct position.

28. The computing platform (100) as claimed in claim 15, wherein said measurement module (110) is configured to check whether said container (102) is fit enough to go to next carding machine based on said measured quality.

29. The computing platform (100) as claimed in claim 28, wherein said computing platform (100) includes:
   an alert generation module (128) configured to generate an alert to stop process of said container (102) from said carding machine (106) to said second carding machine, if said container (102) contains bad quality material; and
   a recommendation module (130) configured to recommend maintenance of desired quality of material filled in said container (102), to said user.

30. The computing platform (100) as claimed in claim 15, wherein said computing platform (100) includes a report generation module (118) configured to cooperate with said output generation module (116) and said alert generation module (128), said report generation module (118) is configured to generate a report based on said generated output and said generated alert.

31. The computing platform (100) as claimed in claim 15, wherein said computing platform (100) includes a prediction module (132) configured to predict said quality of material filled in said container (102) associated with said carding machine (104).

32. The computing platform (100) as claimed in claim 15, wherein said computing platform (100) includes a handheld device configured to access said computing platform (100), and perform functionalities on said computing platform (100).

\* \* \* \* \*